W. Campbell,
Photographic Plate-Shield.
Nº 27,269. Patented Feb. 28, 1860.
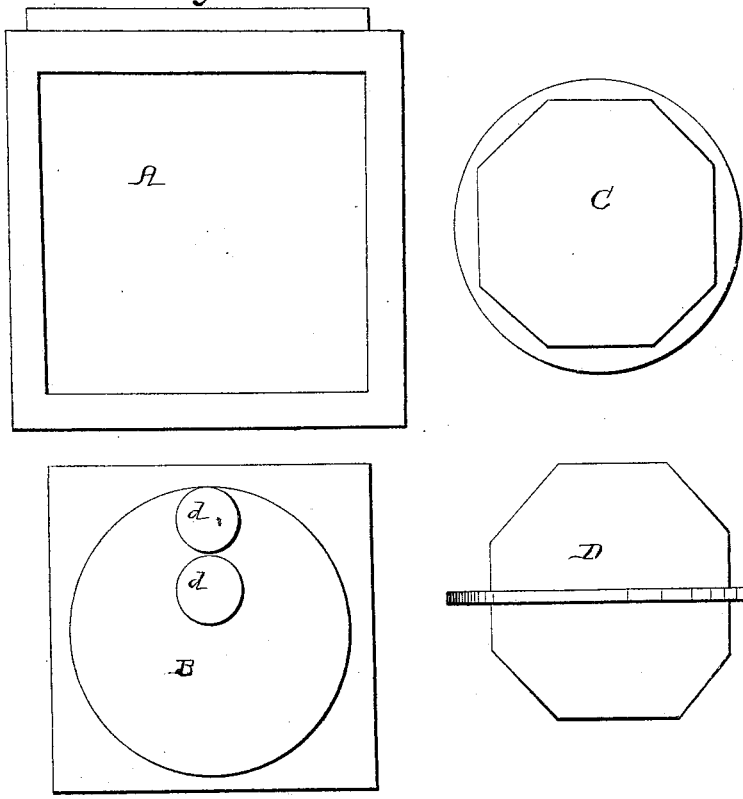
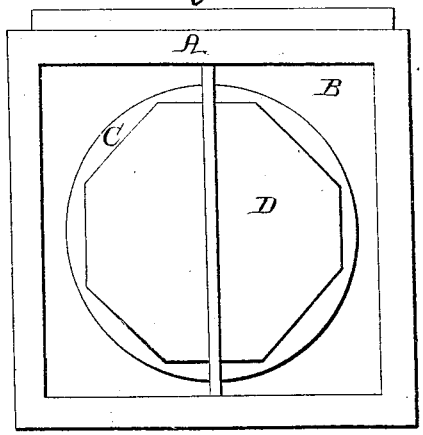

UNITED STATES PATENT OFFICE.

WILLIAM CAMPBELL, OF JERSEY CITY, NEW JERSEY.

PHOTOGRAPHIC-PLATE SHIELD.

Specification of Letters Patent No. 27,269, dated February 28, 1860.

*To all whom it may concern:*

Be it known that I, WILLIAM CAMPBELL, of Jersey City, County of Hudson, and State of New Jersey, have invented a new and Improved Camera-Shield; and I do hereby declare that the following is a full and exact description thereof, reference being had to the accompanying drawings and to the letters of reference marked thereon.

The nature of my invention consists in providing the photographic camera shield with a revolving plate frame and a slide with one or more small apertures, so that by revolving the plate different parts of the same are successively brought before the apertures of the slide, thus enabling the photographer to produce easily many impressions of a scene on the same plate.

To enable others skilled in the art to make and use my invention I will proceed to describe its construction and operation.

Figure 1 in the accompanying drawings represents the several essential parts of my improved camera shield; Fig. 2 represents the same parts combined, the same letters indicating like parts in both figures.

(A) is the outer frame or "stile," which is made of the usual form and manner, except that the ordinary hinged door may be omitted; the frame (A) is provided with a slide as usual.

(B) is the plate frame receptacle or carrier, made to fit inside the "stile." (B) on its back side is cut away or chambered so as to receive the plate frame (C). The circular chambered part of the plate frame carrier (B) is pierced by the apertures (d d) outside of the center of the chambered part. The front part of the receptacle (B) is provided with a slide which may be made to cover either or both of the apertures (d d).

(C) is the plate frame of a circular form so as to fit and revolve in the chambered part of (B).

(D) is the plate cover which serves the purpose of the ordinary door in keeping the plate in position and excluding the light.

In the use of my camera shield, I focus the view to be taken upon a part of the ground glass corresponding in size and position to one of the apertures (d d). I then replace the ground glass by the camera shield withdraw the main slide and take one impression; I then revolve the plate frame till a new surface of the plate is presented to the aperture, and thus secure a second impression. And by the same way I make other impressions till by one complete revolution of the plate I have covered the surface in range of the aperture. I then remove the camera shield from the camera box, and focus on the part of the ground glass corresponding to the second aperture of the shield, and having opened the second aperture of the shield, I proceed to take a new series of impressions precisely as at first.

It is evident that a camera with two tubes corresponding in position to the apertures (d d) might be used, also the slide which covers the apertures (d d) might be a part of the main slide of the shield. I do not therefore limit myself to the construction of the plate frame receptacle (B) precisely as described but

I claim—

The revolving plate frame (C) substantially in the manner and for the purpose as set forth.

WILLIAM CAMPBELL.

Witnesses:
  CH. A. SEELY,
  H. GARBANATI.